United States Patent [19]

Roberts

[11] Patent Number: 4,709,188
[45] Date of Patent: Nov. 24, 1987

[54] OPERATION OF STANDBY FILAMENT ASSOCIATED WITH AN AC ARC DISCHARGE LAMP BALLAST

[75] Inventor: Victor D. Roberts, Burnt Hills, N.Y.

[73] Assignee: General Electric Company, Schenectady, N.Y.

[21] Appl. No.: 812,551

[22] Filed: Dec. 23, 1985

[51] Int. Cl.[4] .................. H05B 35/00; H05B 37/02
[52] U.S. Cl. .................... 315/178; 315/205; 315/307; 315/208; 315/226; 315/DIG. 7; 315/196; 315/49; 315/89; 363/37
[58] Field of Search ............. 315/178, 196, 197, 320, 315/DIG. 7, 49, 176, 89, 182, 183, 217, 324, 325, 224; 363/37

[56] References Cited

U.S. PATENT DOCUMENTS

| | | | |
|---|---|---|---|
| 4,004,188 | 1/1977 | Cooper | 315/DIG. 7 |
| 4,170,747 | 10/1979 | Holmes | 315/DIG. 7 |
| 4,350,930 | 9/1982 | Peil et al. | 315/49 |
| 4,464,607 | 8/1984 | Peil et al. | 315/DIG. 7 |
| 4,471,268 | 9/1984 | Brown et al. | 315/178 |
| 4,471,269 | 9/1984 | Ganser et al. | 315/DIG. 7 |
| 4,495,446 | 1/1985 | Brown et al. | 315/206 |
| 4,567,404 | 1/1986 | Flugan | 315/DIG. 7 |
| 4,613,795 | 9/1986 | Itani et al. | 315/224 |
| 4,614,898 | 9/1986 | Itani et al. | 315/DIG. 7 |
| 4,649,321 | 3/1987 | Ferraro | 315/224 |

Primary Examiner—Leo H. Boudreau
Assistant Examiner—Michael J. Nickerson
Attorney, Agent, or Firm—Marvin Snyder; James C. Davis, Jr.

[57] ABSTRACT

An AC polarity-reversing bridge ballast for an arc discharge lamp using an incandescent filament for resistive ballasting and standby illumination powers the filament during hot restart without modifying the low duty cycle operation of the starting oscillator and without introducing additional power switches. The switching elements of the polarity-reversing bridge serve the dual functions of reversing the polarity of the voltage supplied to the arc lamp during normal running conditions and energizing the filament during a restart condition.

9 Claims, 4 Drawing Figures

OPERATION OF STANDBY FILAMENT ASSOCIATED WITH AN AC ARC DISCHARGE LAMP BALLAST

BACKGROUND OF THE INVENTION

The present invention relates in general to lighting units incorporating an arc discharge lamp with an incandescent filament and more specifically to providing power to the incandescent filament whenever the arc discharge lamp is not able to provide light.

Light sources are known in the art which combine an arc-discharge lamp with an incandescent filament. The filament provides standby illumination during various times that the arc lamp is not producing light. During normal operation of the more efficient arc discharge lamp, the filament serves as a resistive ballast for the arc lamp. An example of this type of light source is Peil et al., U.S. Pat. No. 4,350,930, of common assignment, which is hereby incorporated by reference.

Arc discharge lamps exhibit three distinct operating states, namely the breakdown mode, the glow discharge mode and the arc mode. Thus, operating circuits for arc lamps energize the arc lamp in a manner which is appropriate to the instantaneous operating state of the lamp. For example, to start the arc lamp from the breakdown mode, high voltage pulses are supplied to the arc lamp in order to cause electrical breakdown of the gas contained in the arc lamp. The arc lamp is usually operated at a somewhat lower voltage during the glow mode when the gas warms up and its voltage drop decreases. In the arc mode, an even lower voltage (either AC or DC) is supplied to sustain a stable, low voltage arc. An AC arc-mode voltage can be supplied to the arc lamp by a polarity-reversing bridge.

The voltage required to cause a breakdown of the gas when the gas temperature is above room temperature is proportional to the temperature of the gas. A hot restart occurs when an arc discharge is interrupted for more than about one millisecond and an attempt is made to re-establish the arc while the gas is still hot. If the gas is at a temperature above a certain threshold, the operating circuit will be unable to cause an electrical breakdown of the gas. In that case, the operating circuit waits a predetermined time for the gas to cool and in the meantime energizes the filament for standby lighting.

The high voltage pulses used to start an arc are typically supplied by a starting oscillator. The starting oscillator also usually supplies power to the filament during the standby period and in some cases during a filament warm-up period prior to a cold start.

A starting oscillator generating high voltage pulses has been found to be undesirable because of large amounts of electromagnetic interference (EMI) produced. An improvement in EMI production is realized by employing a starting oscillator which operates intermittently rather than continuously during starting. This "low duty cycle" oscillator allows a lower power (and hence less expensive) semiconductor switch to be used in the oscillator. However, since the oscillator operates for only a small percentage of the time during hot restart, it can no longer be used to provide filament power. Consequently, filament power is provided either by an additional power switch used to turn on the filament when the oscillator is off, or by holding the oscillator power switch (connected in series with the filament) in its on state continuously for standby lighting when the oscillator is not operating. However, these solutions negate the economy of the low duty cycle oscillator since they require either an additional semiconductor switching element or a higher power-rating for the oscillator power switch.

Accordingly, it is a principal object of the present invention to provide a combination arc lamp and filament lighting system having low cost and low EMI.

It is another object to provide power to the incandescent filament during hot restart and other times without increasing the cost of the low duty cycle oscillator and without adding any extra power semiconductor switches.

SUMMARY OF THE INVENTION

These and other objects are achieved by a lighting system adapted to be coupled to a source of electrical energy, comprising an incandescent filament, an arc discharge lamp, a polarity-reversing bridge, oscillator means and control means.

The polarity-reversing bridge includes at least one converter leg. Each leg is comprised of a pair of switching elements connected in series. The junction of each pair of switching elements is coupled to the arc discharge lamp. Each converter leg is adapted to have one of its switching elements turned on when the bridge is in a first phase and to have its other switching element turned on when the bridge is in a second phase. The bridge is connected in series with the filament.

The oscillator means is coupled to the arc discharge lamp for providing a high-voltage signal to the lamp during its breakdown and glow discharge modes.

The control means is coupled to the bridge and to the oscillator means. It holds the bridge in one of its phases and signals the oscillator means to provide the high-voltage signal in order to start an arc discharge in the lamp. It periodically reverses the phase of the bridge after an arc is established. In addition, it turns on both switching elements in at least one converter leg if the oscillator means fails to establish an arc within a first predetermined time.

The invention further provides a method of providing standby illumination comprising the steps of (1) sensing the failure of the arc discharge lamp to provide illumination after the application of high-voltage signals by a starting oscillator for a first predetermined time, and (2) turning on both switching elements in a single converter leg to energize the filament upon sensing a failure.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
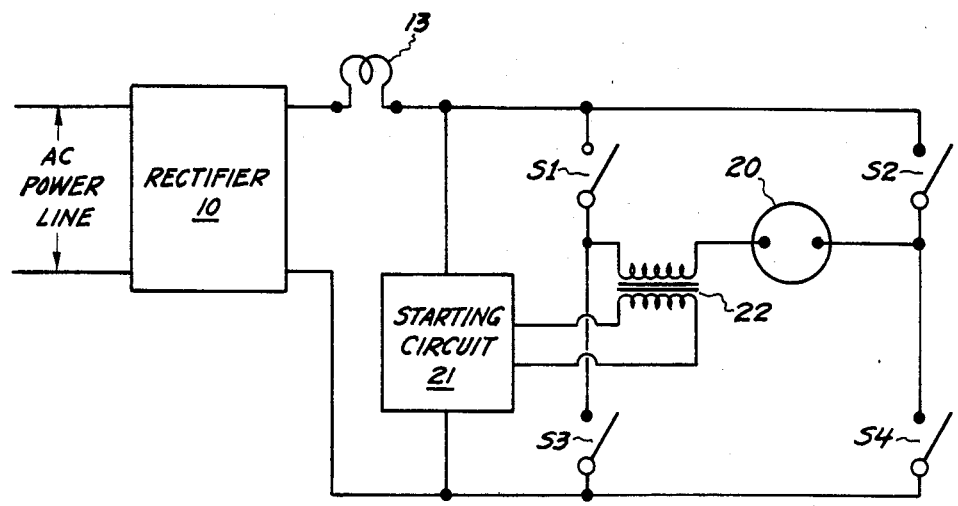
FIG. 1 is a schematic diagram of the lighting system of the invention.

Referring to FIG. 1, a lighting system of the invention includes an incandescent filament 13 and an arc discharge lamp 20. Electrical energy from an AC power line is converted to DC by a rectifier 10. A polarity-reversing bridge comprised of switches S1-S4 is connected in series with filament 13. Switches S1 and S3 are connected in series to form a first converter leg of the bridge and switches S2 and S4 are connected in series to form a second converter leg. Arc lamp 20 is coupled to the junction of S1 and S3 and to the junction of S2 and S4. A starting circuit 21 is coupled to the outputs of rectifier 10, to the primary winding of a transformer 22 and to a control circuit (not shown). The secondary winding of transformer 22 is connected in series with arc lamp 20.

Switches S1-S4 are semiconductor switching elements such as bipolar transistors, field-effect transistors (FETs) or insulated gate transistors (IGTs), and are adapted to be turned on and off by a control circuit (not shown). The operation of switches S1-S4 during starting circuit operation and during normal AC operation is described in U.S. Pat. No. 4,677,346, filed Oct. 28, 1985, of common assignment, which is hereby incorporated by reference in its entirety.

Diagonal pairs of switches are used to obtain first and second phases of the bridge. In one phase, switches S1 and S4 are closed while switches S2 and S3 are held open so that arc lamp 20 receives a voltage of one polarity. In the other phase, switches S2 and S3 are closed while switches S1 and S4 are held open so that arc lamp 20 receives a voltage of opposite polarity. During starting, when starting circuit 21 is providing intermittent high voltage pulses, the polarity-reversing bridge is locked in one of its phases to avoid high voltage across the switches. After start-up is complete, the phase of the bridge is reversed periodically (e.g. 60 hertz).

The failure of starting circuit 21 to cause an electrical breakdown within a first predetermined time can be detected as an absence of current flowing in arc lamp 20 and in that event, the system enters a hot restart mode. The control circuit disables starting circuit 21 and energizes filament 13 for a second predetermined time (e.g. one minute), following the first predetermined time, during which arc lamp 20 cools.

According to the present invention, power is provided to filament 13 during hot restart times (while starting circuit 21 is off) or other times that arc lamp 20 will not light, by closing both of the switches in one of the converter legs, thus placing filament 13 directly across the outputs of rectifier 10. The use of switches S1-S4 to perform this additional function reduces the cost of the system since the need for a separate high current semiconductor switch to control the filament is eliminated.

Switches S1-S4 of the polarity-reversing bridge are designed to carry the arc lamp normal operating current with low power loss. When filament 13 is placed directly across rectifier 10, current flow can be between one and two times the normal operating current. Therefore, it may be desirable to turn on all of switches S1-S4 so that the filament current is distributed between all four devices.

After a predetermined cooling off period, a single phase of the bridge is turned on and another attempt is made to establish an arc. Several failures to start the arc lamp may indicate that the heat from the filament is preventing the arc lamp from cooling sufficiently. Therefore, if after a third predetermined time from the initial starting attempt arc lamp 20 has not started, filament power can be lowered to reduce heating of the lighting system. The filament can be dimmed by switching it on and off at a frequency high enough to prevent the appearance of flicker. The duty cycle at which it is switched will determine the amount of dimming and may be decreased if the arc lamp still fails to light.

Figure 2:
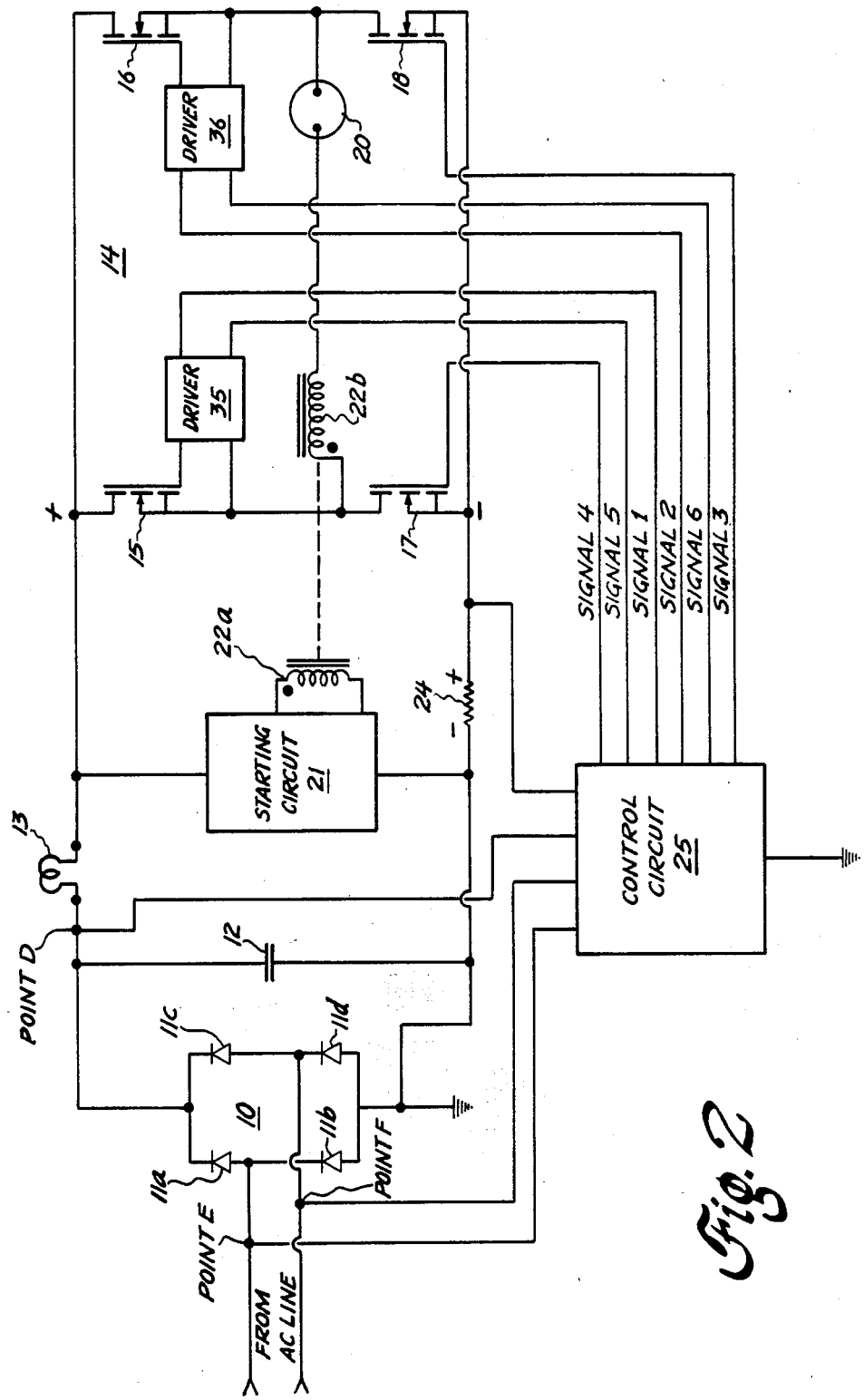
FIG. 2 shows the system of FIG. 1 in greater detail.

FIG. 2 shows one embodiment of the invention in greater detail. Rectifier 10 comprises a diode bridge rectifier including diodes 11a-11d. Capacitor 12 is connected across rectifier 10. Polarity-reversing bridge 14 comprises FETs 15-18. Control circuit 25 provides SIGNALS 1-6 for controlling FETs 15-18. Driver circuits 35 and 36 are provided for driving FETs 15 and 16, respectively, while FETs 17 and 18 are driven directly from control circuit 25. An arc sensing resistor 24 is connected in series with bridge 14 and provides a current signal to control circuit 25. Control circuit 25 is also connected to rectifier 10 so that it can switch FETs 15-18 synchronously with the AC line (i.e. at 60 hertz). The exact configurations of control circuit 25, of starting circuit 21, of driver circuits 35 and 36 and of rectifier 10 are not unique and depend on the desired operation and characteristics of arc lamp 20 and filament 13. By way of example, modifications to the AC ballast disclosed in copending application Ser. No. 791,831, for implementing the present invention will be described.

Figure 3:
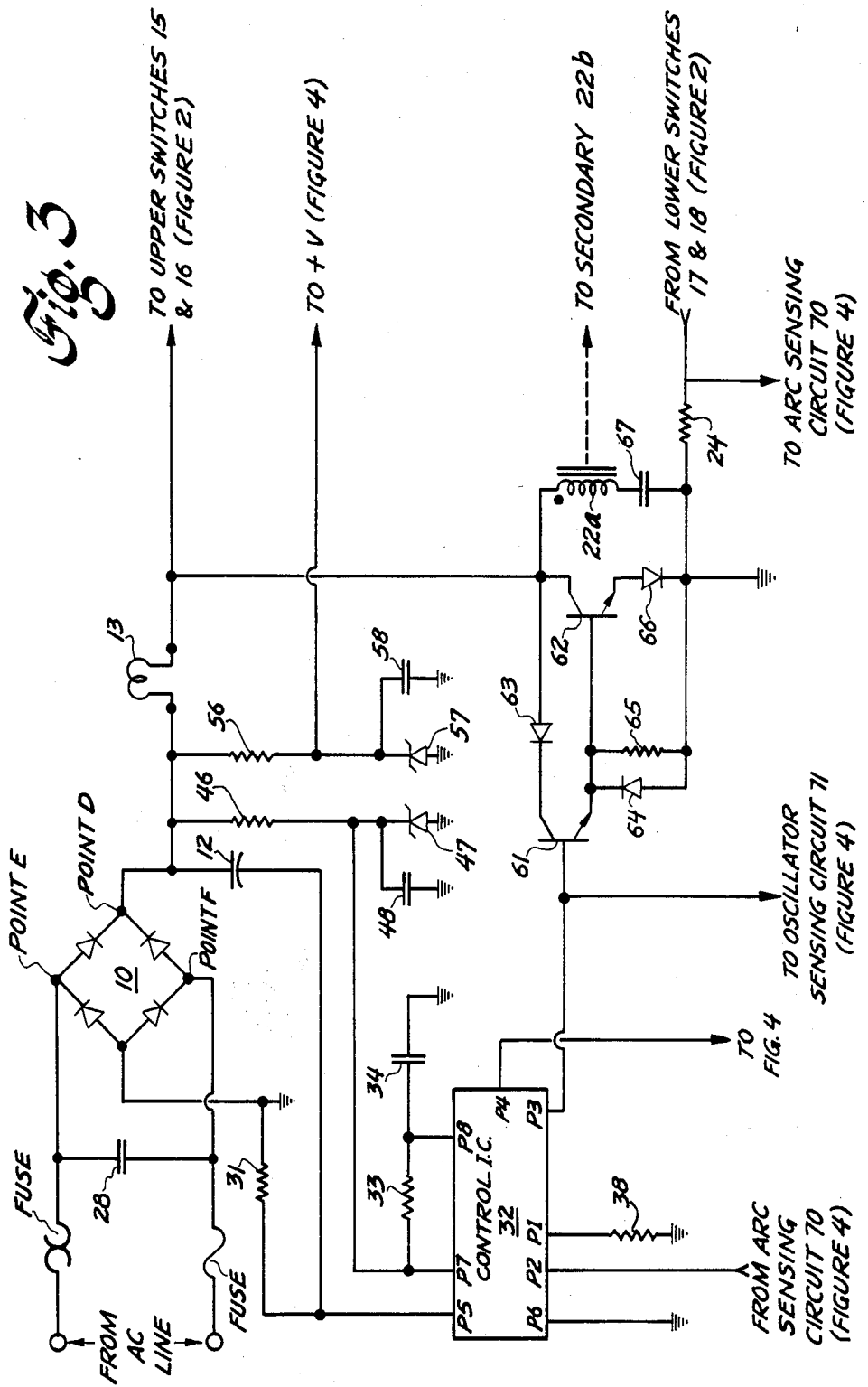
FIG. 3 is a schematic diagram of a circuit including a ballast control I.C. useful in carrying out the invention.

FIG. 3 is a schematic diagram of a circuit which includes a control integrated circuit (IC) 32 and associated circuitry which are described in U.S. Pat. No. 4,495,446 entitled, "Lighting Unit With Improved Control Sequence", issued to Brown et al. on Jan. 22, 1985, and assigned to the assignee of the present application. The patent is hereby incorporated by reference.

Diode bridge rectifier 10 is coupled to the AC line. Filter capacitor 12 is coupled across the outputs of rectifier 10 and is connected in series with a resistor 31, with 60 hertz clock signals generated across resistor 31 being provided to control IC 32. Filament 13 couples DC power to bridge 14 of FIG. 2. A resistor 46 and a zener diode 47 (typically rated at 7.5 volts) are connected in series from point D (the positive side of rectifier 10) to circuit common. A capacitor 48 is connected across zener diode 47. The voltage across zener diode 47 and capacitor 48 is a regulated DC voltage which is provided to terminal P7 of control IC 32. A resistor 56 and a zener diode 57 (typically rated at 15 volts) are connected in series between point D and circuit common. A capacitor 58 is connected across zener diode 57, providing a DC voltage +V to control logic circuits in FIG. 4 which will be described hereinbelow.

Terminal P1 of control IC 32 is coupled to circuit common through a resistor 38. Terminal P2 is connected to an arc sensing circuit 70 in FIG. 4, described below. Terminal P3 is connected to the base of a transistor 61 and to an oscillator sensing circuit 71 also shown in FIG. 4. Terminal P4 is coupled to various points in FIG. 4. Terminal P5 is connected to the junction between filter capacitor 12 and resistor 31. Terminal P6 is connected to circuit common. A resistor 33 is connected between terminals P7 and P8. A capacitor 34 couples terminal P8 to circuit common.

The collector of transistor 61 is connected to the cathode of a diode 63. The emitter of transistor 61 is connected to the base of a transistor 62, to the cathode of a diode 64 and to one side of a resistor 65. The collector of transistor 62 is connected to the anode of diode 63, the dotted terminal of primary winding 22a and to the junction between filament 13 and bridge 14. The emitter of transistor 62 is coupled to circuit common through a diode 66. The anode of diode 64 and the other side of resistor 65 are also connected to circuit common. A capacitor 67 couples the undotted terminal of primary winding 22a to circuit common. Arc sensing resistor 24 is connected between circuit common and the lower switches of bridge 14. The junction between arc sensing resistor 24 and the switching bridge is connected to arc sensing circuit 70 of FIG. 4.

Control IC 32 senses whether an arc has been established in lamp 20 by examining the signal at terminal P2. As described in U.S. Pat. No. 4,495,446, control IC 32 initiates illumination from filament 13 by producing an output signal at terminal P4. An output signal from terminal P3 supplies high frequency pulses through transistors 61 and 62 to primary winding 22a until after a normal running arc is established in lamp 20 (FIG. 1).

Figure 4:
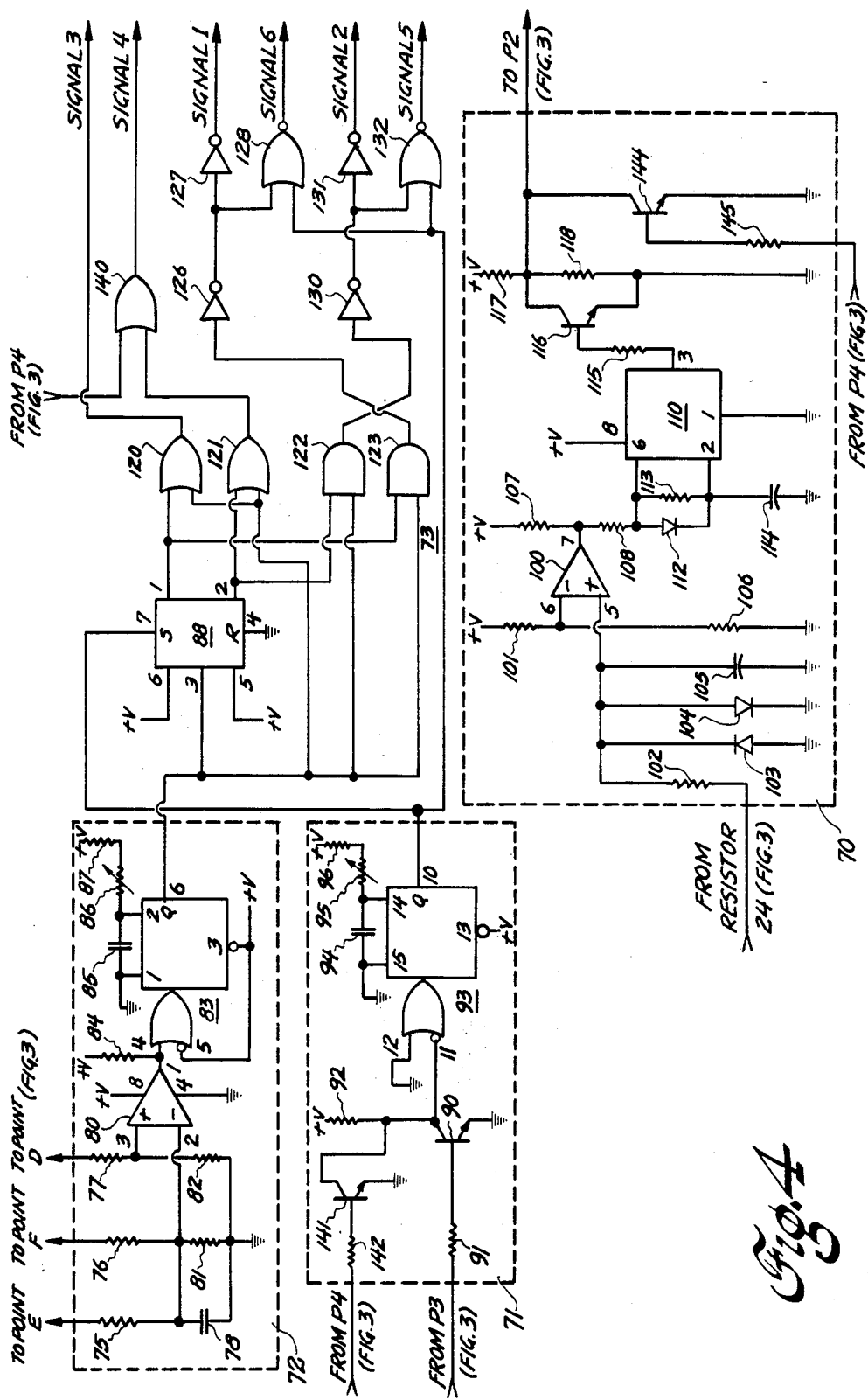
FIG. 4 is a schematic diagram of control circuitry for implementing the invention.

Turning now to FIG. 4, a schematic diagram of control circuit 25 of FIG. 2 will be described. The circuitry shown in FIG. 4 provides 6 logic level control outputs for controlling the bridge switching devices. It also synchronizes the operation of the polarity-reversing bridge with the starting oscillator in control IC 32 (FIG. 3). The portion of control circuit 25 shown in FIG. 4 includes an arc sensing circuit 70, an oscillator sensing circuit 71 and a diode conduction sensing circuit 72 all connected to a logic means 73.

Diode conduction sensing circuit 72 provides a 120 hertz clock as described in U.S. Pat. Nos. 4,613,795 and 4,614,898 filed on June 24, 1985 and assigned to the assignee of the present application, both of which are hereby incorporated by reference. Resistors 75 and 76 are connected to the AC inputs of the diode bridge rectifier and resistor 77 is connected to the DC output of the rectifier. Shortly after the voltage peak of each half-cycle of the 60 hertz AC source, the AC line voltage drops below the voltage on the main energy storage filter capacitor 12 (FIG. 3). At that time the output of comparator 80 (shown as a CA3290 voltage comparator) goes high, triggering a one-shot multivibrator 83 (shown as an MC14528 multivibrator). The Q output of one-shot 83 goes high for a time determined by the combination of capacitor 85 and resistors 86 and 87. The positive-going edge of the output pulse from one-shot 83 serves as a clock pulse for initiating switching of the bridge or refresh if the switching bridge is locked in a single phase, while the width of the output pulse of one-shot 83 determines the refresh time, typically 10 to 30 microseconds.

JK flip-flop 88 of logic means 73 (shown as an MC14027 flip-flop) has its clock input (pin 3) connected to the Q output of one-shot 83. The SET input of flip-flop 88 is connected to the output of oscillator sensing circuit 71. The Q output of flip-flop 88 is connected to one input of a two-input OR gate 120 and to one input of a two-input AND gate 123. The NOT Q output of flip-flop 88 is connected to one input of a two-input OR gate 121 and to one input of a two-input AND gate 122. The Q output of one-shot 83 is connected to the remaining inputs of gates 120-123. The output of OR gate 120 provides SIGNAL 3. The output of OR gate 121 is connected to one input of a two-input OR gate 140. The other input of OR gate 140 is connected to terminal P4 of the control IC (FIG. 3). The output of OR gate 140 provides SIGNAL 4. The output of AND gate 122 is inverted twice by inverters 130 and 131 to provide SIGNAL 2. The output of inverter 130 is connected to one input of a two-input NOR gate 132, the output of which provides SIGNAL 5. The output of AND gate 123 is inverted twice by inverters 126 and 127 to provide SIGNAL 1. The output of inverter 126 is connected to one input of a two-input NOR gate 128, the output of which provides SIGNAL 6. The remaining inputs of NOR gates 128 and 132 are connected to the output of oscillator sensing circuit 71.

The oscillator control IC described in previously mentioned U.S.Pat. No. 4,495,446, measures directly the voltage developed across its arc sense resistor to determine whether the arc tube thereof is conducting. Due to the operation of the ballast of this invention, a separate arc sensing circuit 70 is provided as shown in FIG. 4. A resistor 102 couples the signal from the arc sensing resistor to the non-inverting input of a comparator 100 (shown as a CA3290 comparator). The noninverting input of comparator 100 is coupled to circuit common through a diode 103, a diode 104 and a capacitor 105. The inverting input of comparator 100 is connected to a voltage divider comprised of a resistor 101 and a resistor 106. This voltage divider causes comparator 100 to switch output signals at 43 millivolts at the non-inverting input which corresponds to about 36 milliamps of arc tube current. The input circuit to the noninverting input of comparator 100 is a low pass filter with a time constant of about 1 millisecond which eliminates false arc sensing during the refresh cycle of the switching bridge during starting circuit operation when both sides of the bridge are conducting, as described in U.S. Pat. No. 4,677,346.

The output of comparator 100 is coupled to +V through a resistor 107 and to pin 6 of a timing circuit 110 (shown as an MC1455 timing circuit) through a resistor 108. A diode 112 and a resistor 113 are connected between pins 2 and 6 of timing circuit 110. Pin 2 is connected to circuit common through a capacitor 114. Timing circuit 110 is configured as a pulse stretcher to prevent false "no arc" signals during starting when some arc tubes operate in an erratic manner. The output (pin 3) of timing circuit 110 is coupled to the base of a transistor 116 through a resistor 115. The collector of transistor 116 is connected to +V through a resistor 117 and is connected to the emitter of transistor 116 through a resistor 118. The emitter of transistor 116 is connected to circuit common. A transistor 144 has its collector connected to the collector of transistor 116, its emitter connected to circuit common and its base coupled to terminal P4 of IC 32 through a resistor 145. The junction of resistors 117 and 118 provides the output of arc sensing circuit 70 and is connected to terminal P2 of IC32 in FIG. 3. Transistor 116 inverts the output signal from timing circuit 110. Transistor 144 ensures that the output signal of arc sensing circuit 70 will be low when the filament is on so that filament current is not misinterpreted as arc current.

Oscillator sensing circuit 71 receives one of its inputs from the junction of terminal P3 of control IC 32 and the base of transistor 61 in FIG. 3. This input signal is coupled to the base of a transistor 90 through a resistor 91. The emitter of transistor 90 is connected to circuit common. The collector of transistor 90 is coupled to +V through a resistor 92 and is connected to the negative going trigger input of a retriggerable one-shot multivibrator 93 (shown as an MC14528). The other input signal of circuit 71 from terminal P4 is coupled to the base of a transistor 141 through a resistor 142. The collector of transistor 141 is connected to the collector of transistor 90. The emitter of transistor 141 is connected to circuit common. The Q output of one-shot 93 is connected to the SET input of flip-flop 88 and to NOR gates 128 and 132. Transistor 90 operates as an inverting amplifier. Negative-going transitions from transistor 90 trigger one-shot 93, thus setting its Q output during operation of the starting oscillator to lock the bridge in one phase. Transistor 141 locks the bridge in the same phase when the filament is on. Capacitor 94 and resistors 95 and 96 connected to one-shot 93 set the pulse duration of one-shot 93 long enough to allow a warm up period of the arc tube before initiating switching of the switching bridge. A typical delay is about 15 seconds, but the actual time required will vary with arc tube size, operating conditions and arc tube ingredients.

In operation of the circuit of FIG. 4, during a starting condition or during standby illumination for a hot restart (i.e. the output of oscillator sensing circuit 71 is high), flip-flop 88 is set by the output signal from oscillator sensing circuit 71. Therefore, the switching bridge will be locked in a single phase with FETs 15 and 18 turned on.

During standby illumination, terminal P4 of IC 32 will have a high output signal. Therefore, OR gate 140 will have a high output signal, SIGNAL 4 will go high and FET 17 will turn on. Thus, both switches in one converter leg (i.e. FETs 15 and 17) will be on simultaneously. The signal from terminal P4 also turns on transistor 144 to inhibit any arc sense signal and turns on transistor 141 to keep the bridge locked in one phase. Control IC 32 has the capability to operate the filament on DC (terminal P4 output signal is high continuously) or with pulses (to dim the filament as previously described).

The foregoing describes a combination arc lamp and filament lighting system having low cost and low EMI. Power is provided to the filament during hot restart and other times without increasing the cost of the low duty cycle oscillator and without adding any extra power semiconductor switches.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the appended claims cover all such embodiments as fall within the spirit of the invention.

What is claimed is:

1. In a lighting system adapted to be coupled to a source of electrical energy, said system comprising an incandescent filament; an arc discharge lamp; a polarity-reversing bridge including at least one converter leg, each leg being comprised of a pair of switching elements connected in series, the junction of each pair of switching elements being coupled to said arc discharge lamp, each converter leg adapted to have one of its switching elements turned on when said bridge is in a first phase and to have its other switching element turned on when said bridge is in a second phase, said bridge being connected in series with said filament; oscillator means coupled to said arc discharge lamp for providing a high-voltage signal to said arc discharge lamp during its breakdown and glow discharge modes; and control means coupled to said oscillator means for signalling said oscillator means to produce said high-voltage signal in order to start an arc discharge in said arc discharge lamp, the improvement comprising:

circuit means coupling said control means independently to each of said switching elements for holding said bridge in one of said phases when said oscillator means is signalled to produce said high voltage signal and periodically reversing the phase of said bridge after an arc has been established, said control means turning on both switching elements in at least one converter leg if said oscillator means fails to establish an arc within a first predetermined time.

2. The lighting system of claim 1 further comprising arc sensing means coupled to said arc discharge lamp and to said control means for sensing current flowing in said arc discharge lamp to determine whether an arc is established.

3. The lighting system of claim 1 further comprising:
a diode bridge rectifier having its outputs coupled to said filament and said polarity-reversing bridge and having its inputs adapted to be coupled to an AC line; and
a filter capacitor coupled across said outputs of said diode bridge rectifier.

4. In a lighting system adapted to be coupled to a source of electrical energy, said system comprising an incandescent filament; an arc discharge lamp; a polarity-reversing bridge including a pair of converter legs, each of said legs being comprised of a pair of switching elements connected in series, the junction of each pair of switching elements being coupled to said arc discharge lamp, each converter leg adapted to have one of its switching elements turned on when said bridge is in a first phase and to have its other switching element turned on when said bridge is in a second phase, said bridge being connected in series with said filament; oscillator means coupled to said arc discharge lamp for providing a high-voltage signal to said arc discharge lamp during its breakdown and glow discharge modes; and control means coupled to said oscillator means for signalling said oscillator means to produce said high-voltage signal in order to start an arc discharge in said arc discharge lamp, the improvement comprising:

circuit means coupling said control means independently to each of said switching elements for holding said bridge in one of said phases when said oscillator means is signalled to produce said high voltage signal and periodically reversing the phase of said bridge after an arc has been established, said control means turning on all switching elements in both of said converter legs if said oscillator means fails to establish an arc within a first predetermined time.

5. The lighting system of claim 4 further comprising arc sensing means coupled to said discharge lamp and to said control means for sensing current flowing in said arc discharge lamp to determine whether an arc is established.

6. The lighting system of claim 4 further comprising:
a diode bridge rectifier having its outputs coupled to said filament and said polarity-reversing bridge and having its inputs adapted to be coupled to an AC line; and
a filter capacitor coupled across said outputs of said diode bridge rectifier.

7. A method of providing standby illumination from a lighting system, said lighting system including an incandescent filament, an arc discharge lamp, a starting oscillator and a polarity-reversing bridge, said incandescent filament being connected in series with said bridge, said bridge having at least one converter leg, each leg including a pair of switching elements connected in series, the junction of said elements being coupled to said arc discharge lamp, said starting oscillator being coupled to said arc discharge lamp for providing a high-voltage signal to said arc discharge lamp during its breakdown and glow discharge modes, said method comprising the steps of:

sensing the failure of said arc discharge lamp to provide illumination after the application of high-voltage signals by said starting oscillator for a first predetermined time; and turning on both switching elements in a single converter leg to energize said filament upon sensing said failure.

8. The method of claim 7 further comprising the steps of:

turning off said filament after a second predetermined time; and thereafter reapplying high-voltage signals from said starting oscillator to said arc discharge lamp for said first predetermined time to retry starting said arc discharge lamp.

9. The method of claim 8 further comprising the step of:

energizing said filament at a reduced duty cycle if said starting oscillator fails to start said arc discharge lamp after a third predetermined time from the first starting attempt.

* * * * *